United States Patent
Wu (10) Patent No.: US 12,489,986 B2
(45) Date of Patent: *Dec. 2, 2025

(54) OPTICAL SENSOR WHICH CAN REDUCE IMAGE FLICKER

(71) Applicant: PixArt Imaging Inc., Hsin-Chu (TW)

(72) Inventor: Chih-Huan Wu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,763

(22) Filed: Jun. 12, 2024

(65) Prior Publication Data

US 2024/0340541 A1 Oct. 10, 2024

Related U.S. Application Data

(63) Continuation of application No. 17/889,366, filed on Aug. 16, 2022, now Pat. No. 12,047,687.

(51) Int. Cl.
*H04N 23/745* (2023.01)
*H04N 23/73* (2023.01)
*H04N 23/743* (2023.01)
*H04N 25/583* (2023.01)
*H04N 25/75* (2023.01)

(52) U.S. Cl.
CPC ........... *H04N 23/745* (2023.01); *H04N 23/73* (2023.01); *H04N 23/743* (2023.01); *H04N 25/583* (2023.01); *H04N 25/75* (2023.01)

(58) Field of Classification Search
CPC .... H04N 23/73; H04N 23/743; H04N 23/745; H04N 25/583; H04N 25/75
See application file for complete search history.

(56) References Cited

U.S. PATENT DOCUMENTS

| | | | | |
|---|---|---|---|---|
| 7,920,175 B2* | 4/2011 | Kawarada | ............ | H04N 23/684 348/226.1 |
| 2020/0213502 A1* | 7/2020 | Shigeta | .................. | H04N 23/73 |
| 2023/0083218 A1* | 3/2023 | Hsu | ...................... | H04N 23/745 348/297 |

OTHER PUBLICATIONS

En-Feng Hsu, the specification, including the claims, and drawings in the U.S. Appl. No. 17/471,260, filed Sep. 10, 2021.

* cited by examiner

*Primary Examiner* — Lin Ye
*Assistant Examiner* — Chriss S Yoder, III
(74) *Attorney, Agent, or Firm* — Winston Hsu (57) ABSTRACT

An optical sensor, for sensing a sensing frame corresponding to a flicker period of ambient light, comprising: a pixel array, configured to perform N times of exposure operations via at least one pixel of the pixel array in N exposure time intervals to generate N sub-frames, wherein a summation of the N exposure time intervals equals to a sensing interval and the sensing interval is less than or identical to a first flicker period. The optical sensor adds the N sub-frames to generate a summing sub-frame. The sensing frame comprises the summing sub-frame. The adding operation can also be performed to digital signals generated from the sub-frames. The influences caused by the fluctuation of ambient light can be neutralized, since the frame or portion of the frame is sensed at least twice at different phases of a single flicked period. By this way, the conventional flicker issue can be improved.

12 Claims, 7 Drawing Sheets

OPTICAL SENSOR WHICH CAN REDUCE IMAGE FLICKER

CROSS REFERENCE TO RELATED APPLICATIONS

This application is a continuation application of U.S. application Ser. No. 17/889,366, filed on Aug. 16, 2022. The content of the application is incorporated herein by reference.

BACKGROUND OF THE INVENTION

1. Field of the Invention

The present invention relates to an optical sensor, and particularly relates to an optical sensor which can reduce image flicker by performing more than one exposure operations in a single flicker period.

2. Description of the Prior Art

A motion detector adopting an optical sensor identifies the object motion by calculating light intensity variation in image frames captured by the optical sensor. Indoor ambient light is sometimes provided by the fluorescent lamps that have flickers due to AC nature of the power system. Therefore, if the optical sensor operates indoor, the average brightness of the image frames captured by the optical sensor may fluctuate between bright and dark if a frame rate of the optical sensor is not synchronized to a flicker frequency of ambient light, such that incorrect motion may be identified.

Figure 1:
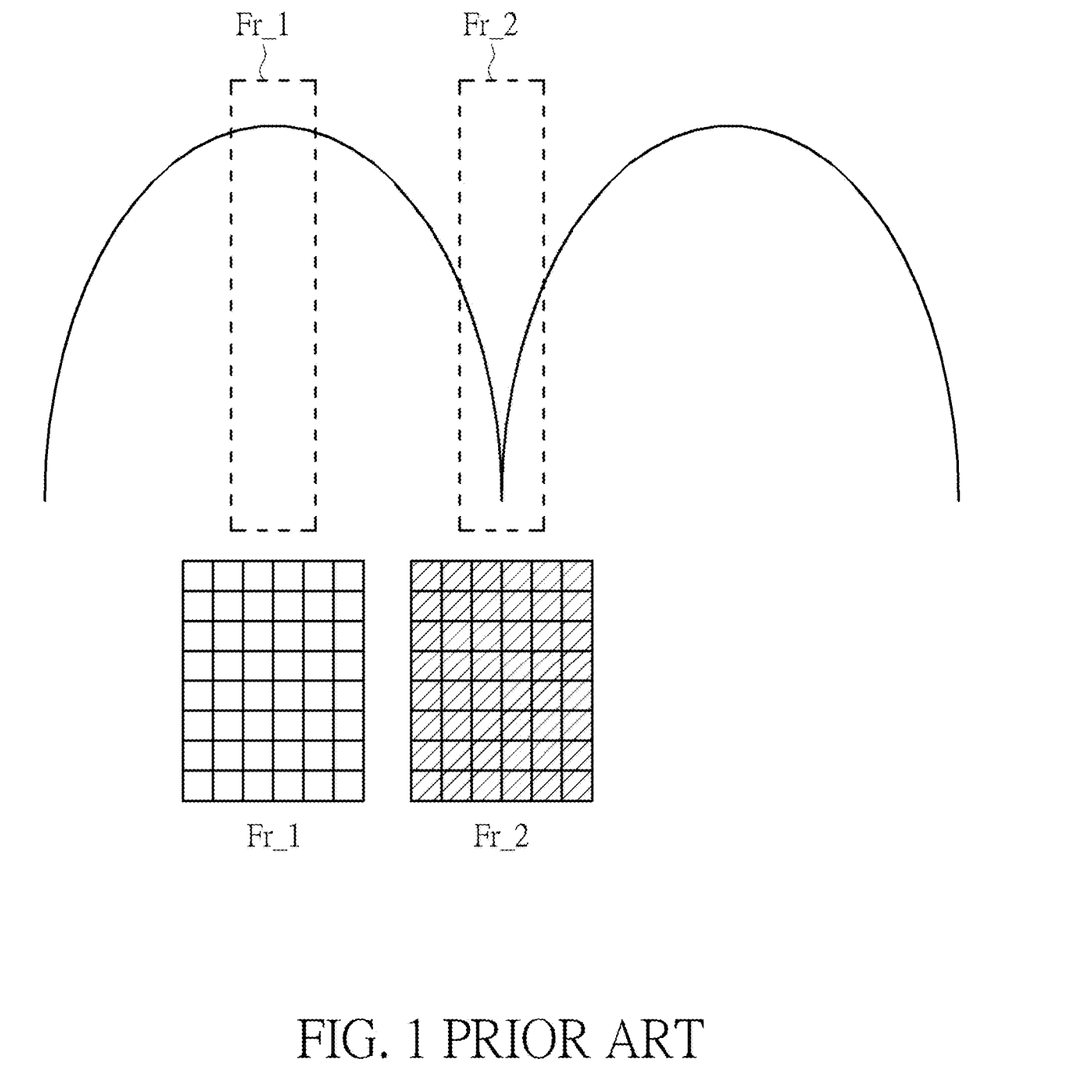
FIG. 1 is a schematic diagram illustrating a conventional image flicker issue.

FIG. 1 is a schematic diagram illustrating a conventional image flicker issue. As illustrated in FIG. 1, the optical sensor captures a frame Fr_1 when the ambient light fluctuates to its brightest intensity, thus the frame Fr_1 has a maximum average brightness. On the opposite, the optical sensor captures a frame Fr_2 when the ambient light fluctuates to its darkest intensity, thus the frame Fr_2 has a minimum average brightness. Such brightness variation causes an incorrect object motion computation.

SUMMARY OF THE INVENTION

One objective of the present invention is to provide an optical sensor which can reduce image flicker.

One embodiment of the present invention provides an optical sensor, for sensing a sensing frame corresponding to a flicker period of ambient light, comprising: a pixel array, configured to perform N times of exposure operations via at least one pixel of the pixel array in N exposure time intervals to generate N sub-frames, wherein a summation of the N exposure time intervals equals to a sensing interval and the sensing interval is less than or identical to a first flicker period; wherein the optical sensor is further configured to add the N sub-frames to generate a summing sub-frame, wherein the sensing frame comprises the summing sub-frame.

Another embodiment of the present invention provides an optical sensor, for sensing a sensing frame corresponding to a flicker period of ambient light, comprising: a pixel array, configured to perform N times of exposure operations via at least one pixel of the pixel array in N exposure time intervals to generate N sub-frames, wherein a summation of the N exposure time intervals equals to a sensing interval and the sensing interval is less than or identical to a first flicker period; a read out circuit, configured to read the N sub-frames to generate sub analog sensing signals; an ADC, configured to transform the analog sensing signals to sub digital sensing signals; and a summing circuit, configured to add the sub digital sensing signals to generate a digital sensing signal corresponding to the sensing frame.

In view of above-mentioned embodiments, the influences caused by the fluctuation of ambient light can be neutralized, since the frame or portion of the frame is sensed at least twice at different phases of a single flicked period. By this way, the conventional flicker issue can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The term "first", "second", "third" in following descriptions are only for the purpose of distinguishing different one elements, and do not mean the sequence of the elements. For example, a first device and a second device only mean these devices can have the same structure but are different devices.

Figure 2:
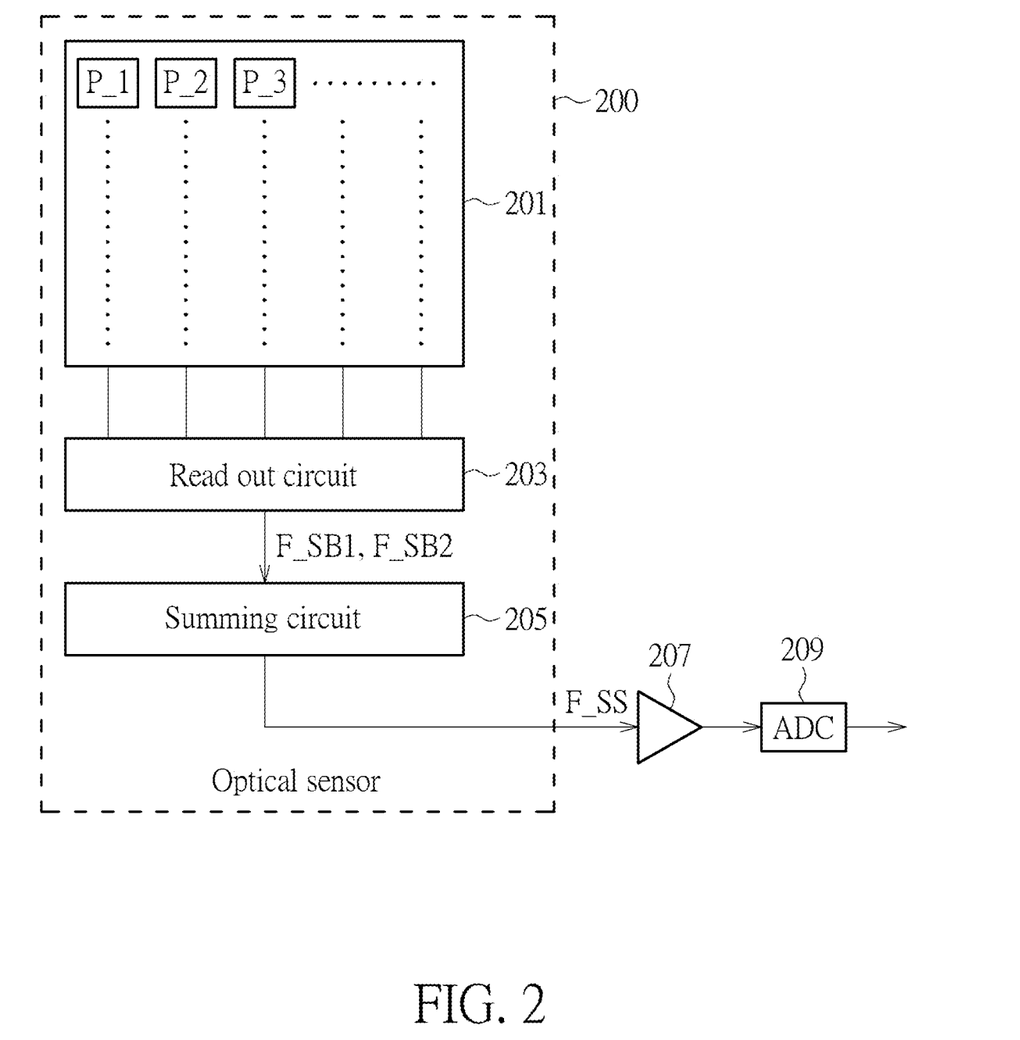
FIG. 2 is a block diagram illustrating an optical sensor according to one embodiment of the present invention.
Figure 3:
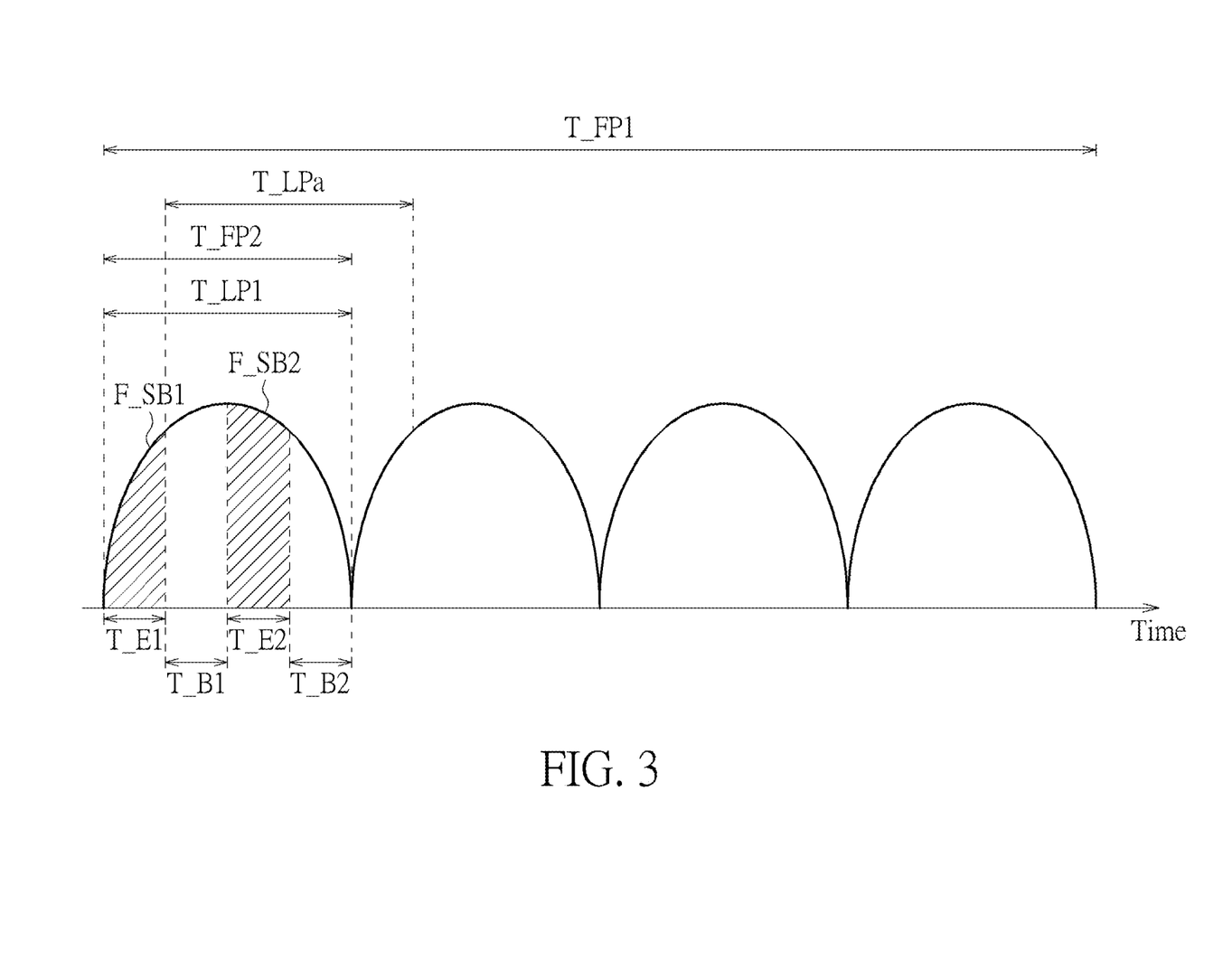
FIG. 3, FIG. 4 and FIG. 5 are schematic diagrams illustrating exposure operations according to different embodiments of the present invention.

FIG. 2 is a block diagram illustrating an optical sensor according to one embodiment of the present invention. FIG. 3 is a schematic diagram illustrating exposure operations according to one embodiment of the present invention. Please refer to FIG. 2 and FIG. 3 together for a better understanding of the present invention.

As illustrated in FIG. 2, the optical sensor 200, which can sense a sensing frame corresponding to a flicker period of ambient light, comprises a pixel array 201, a read out circuit 203 and a summing circuit 205. The pixel array 201, which comprises a plurality of pixels P_1, P_2, P_3, is configured to perform N times of exposure operations via all pixels of the pixel array 201 in N exposure time intervals to generate N sub-frames. Please note the description "perform N times of exposure operations via all pixels of the pixel array 201" means using N times of exposure operations to generate a frame rather than generating N frames. Details of "perform N times of exposure operations via all pixels of the pixel array 201" are described in following descriptions. N is a positive integer equal to or larger than 2. Such operation can be named as "distributed exposure".

The summation of N exposure time intervals equals to a sensing interval which is equal to or less than a first flicker period. The flicker period means a time period in which the ambient light fluctuates from darkest to brightest and then to darkest again. Alternatively, the flicker period can mean a time period in which the ambient light fluctuates from brightest to darkest and then to brightest again. For example, as illustrated in FIG. 3, the pixel array 201 generates the sensing frame F_SS via two times of exposure operations in two exposure time intervals T_E1, T_E2 to generate two sub-frames F_SB1, F_SB2 in the first flicker period T_LP1. For more detail, in the embodiment of FIG. 3, a length of the first frame period T_FP1 is four times of the first flicker period T_LP1. For example, the first frame period T_FP1 is ⅟30 second and the first frame period T_FP1 is ⅟120. Also, in the embodiment of FIG. 3, the exposure time which is needed for generating a frame in a conventional image sensing step (i.e., a conventional necessary frame exposure time) is divided in to two exposure operations which are performed in the first flicker period T_LP1 and generate the sub-frames F_SB1, F_SB2.

The summing circuit 205, which can be integrated into the read out circuit 203, is configured to add the sub-frames F_SB1, F_SB2 to generate a summing sub-frame. Please note, in the embodiment of FIG. 2, the sub-frames F_SB1, F_SB2 and the summing sub-frame are all analog signals, rather than digital format frames.

As above-mentioned, the summation of N exposure time intervals equals to a sensing interval which is equal to or less than a first flicker period. Such sensing interval corresponds to an ambient brightness level of the optical sensor 200. If the ambient brightness level is low, which means the environment around the optical sensor is dark, a larger sensing interval is needed (i.e., the sensing frame F_SS needs a longer exposure). On the opposite, if the ambient brightness level is high, which means the environment around the optical sensor is bright, a smaller sensing interval is needed (i.e., the sensing frame F_SS needs a shorter exposure). In one embodiment, if the sensing interval is equal to or larger than a flicker period, it means a total exposure time of the sensing frame F_SS is equal to or larger than a flicker period. In such case, a single exposure rather than the above-mentioned "distributed exposure" is performed to generate the sensing frame F_SS, since the total exposure time of the sensing frame F_SS covers a full flicker period thus covers the variation of "dark-bright-dark" or "bright-dark-bright". In other words, a conventional image sensing step is performed if the sensing interval is equal to or larger than a flicker period.

In one embodiment, the pixel array 201 applies the rolling shutter to sense sub-frames. That is, the pixel array 201 senses sub-frames row by row. In such embodiment, the exposure time intervals T_E1, T_E2 has longer lengths since the pixel array 201 needs more time to sense the sub-frame. In another embodiment, the pixel array 201 applies the global shutter to sense sub-frames. That senses is, the pixel array 201 sub-frames via all pixels simultaneously. In such embodiment, the exposure time intervals T_E1, T_E2 can have shorter lengths.

Also, the operations of the summing circuit 205 can change corresponding to the lengths of exposure time intervals. For example, in the embodiment of FIG. 3, if lengths of the exposure time intervals T_E1, T_E2 equal to a half of the exposure time interval which is needed for sensing a frame under the same exposure condition in a conventional image sensing step, the summing circuit 205 adds the sub-frames F_SB1, F_SB2 to generate the summing sub-frame, and the optical sensor 200 directly outputs the summing sub-frame as the sensing frame F_SS. In one embodiment, the lengths of the exposure time intervals T_E1, T_E2 are different but a summing of lengths of the exposure time intervals T_E1, T_E2 is still the same as the exposure time interval which is needed for sensing a frame under the same exposure condition in a conventional image sensing step. Also, in one embodiment, the sensing interval is set to be another value besides the exposure time interval of the conventional image sensing step, and the summing circuit 205 further averages the summing sub-frame to generate the sensing frame F_SS.

The output mentioned here means the optical sensor outputs the sensing frame for analog to digital conversion, but not limited. As illustrated in FIG. 2, the optical sensor 200 outputs the sensing frame F_SS to an amplifier 207 for amplifying. Afterwards, the amplified sensing frame F_SS is processed by the ADC (Analog to Digital Converter) 209.

The timing at which the optical sensor 200 outputs the sensing frame F_SS can be changed corresponding to different requirements. In one embodiment, the optical sensor 200 outputs the sensing frame F_SS. after sensing the N sub-frames and before sensing a new sub-frame not belonged to the N sub-frames. In another embodiment, the optical sensor 200 outputs the sensing image F_SS within a time interval of a flicker period after sensing a first one of the N sub-frames. Take FIG. 3 for example, after the sub-frame F_SB1 is sensed, the optical sensor 200 outputs the sensing image F_SS within a time interval of the flicker period T_LPa.

In the embodiment of FIG. 3, a blank time interval exists after each one of the exposure time intervals. For example, the blank time interval T_B1 exists after the exposure time interval T_E1, and the blank time interval T_B2 exists after the exposure time interval T_E2. The optical sensor 200 does not sense any frame in the blank time interval. In other words, the pixel array 200 does not perform any exposure operation in the blank time intervals T_B1, T_B2.

In the embodiment of FIG. 3, the exposure time intervals T_E1, T_E2, and the blank time intervals T_B1, T_B2 are identical. However, at least two of the exposure time intervals T_E1, T_E2, and the blank time intervals T_B1, T_B2 can be different. For example, the exposure time intervals T_E1, T_E2 are identical but the blank time intervals T_B1, T_B2 are different. For another example, the exposure time interval T_E1 and the blank time interval T_B1 are identical, but the exposure time interval T_E2 and the blank time interval T_B2 are different.

Figure 4:
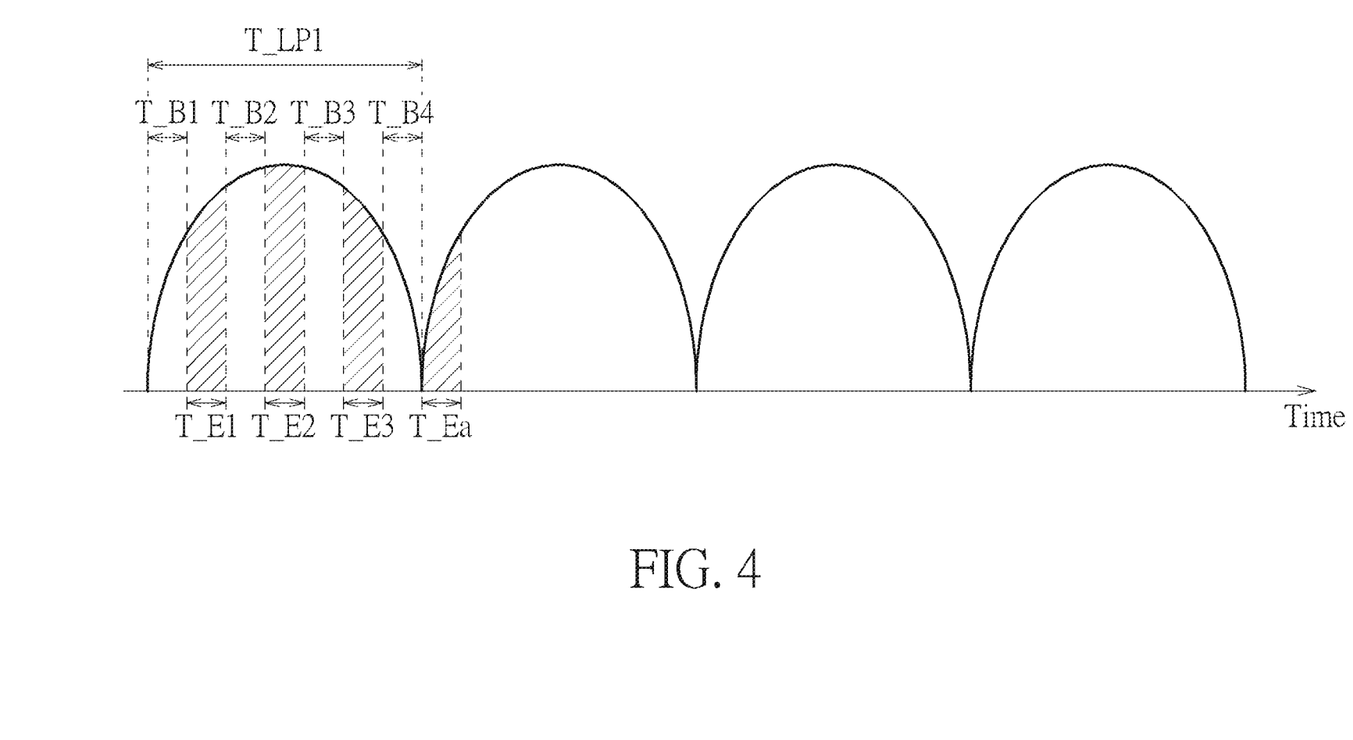

The blank time interval can exist between two neighboring exposure time intervals within the N exposure time intervals, such as the blank time intervals T_B2, T_B3 in FIG. 4. Further, the blank time interval can exist after the N exposure time intervals and before a new sub-frame not belonged to the N sub-frames is captured, such as the blank time interval T_B4 in FIG. 4. The blank time interval T_B4 is after the N exposure time intervals and before a new sub-frame, which is not belonged to the N sub-frames and is generated at the exposure time interval T_Ea.

In one embodiment, the blank time interval only exists when the sensing interval is smaller than a flicker period. In another embodiment, the blank time interval still exists when the sensing interval is equal to or larger than a flicker period. In such case, the sensing interval is allocated within more than one flicker period thus a longer processing time is needed.

Figure 5:
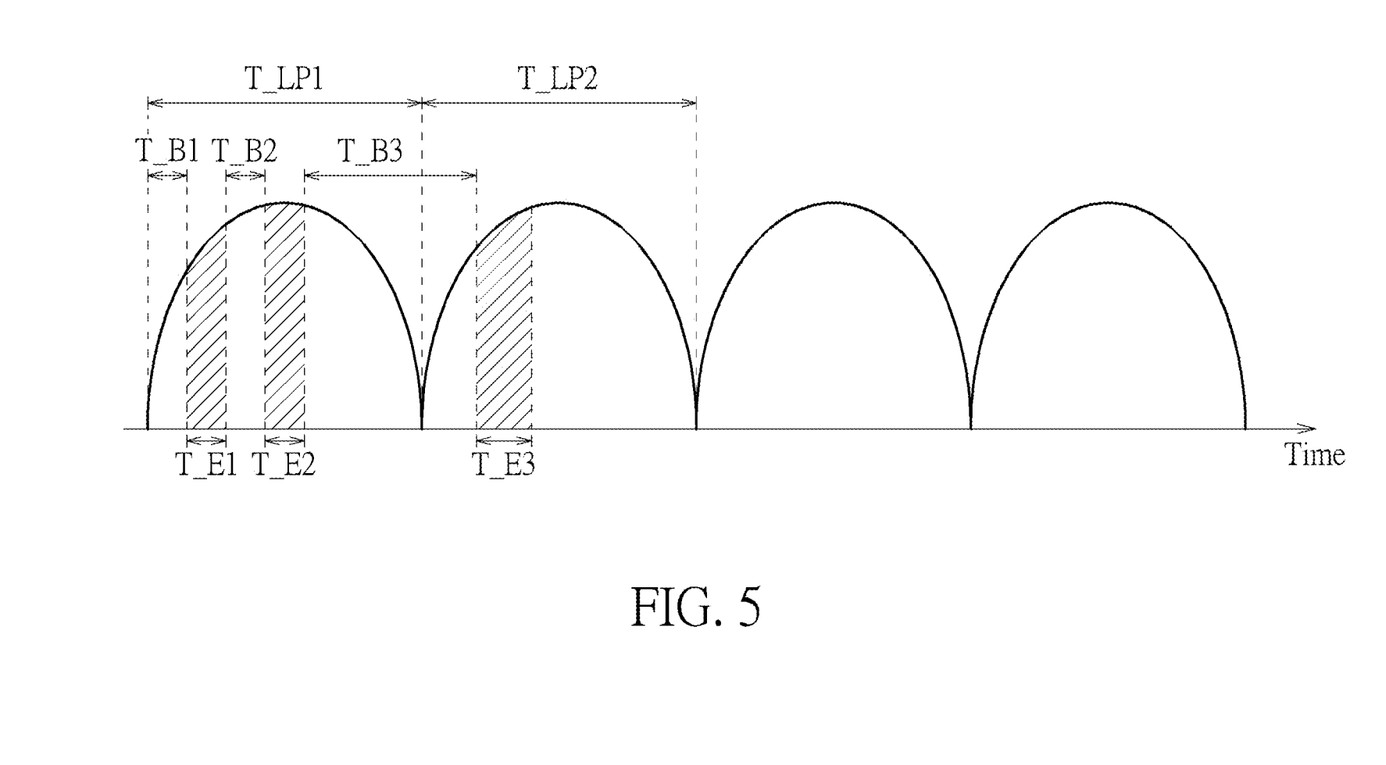

Further, the numbers and the arrangements of the exposure time intervals and the blank time intervals are not limited to the embodiment in FIG. 3. FIG. 4 and FIG. 5 are schematic diagrams illustrating exposure operations according to different embodiments of the present invention. In the embodiment of FIG. 4, three exposure time intervals T_E1, T_E2, T_E3 exist in the first flicker period T_LP1, that is, three exposure operations are performed in the first flicker period T_LP1. Further, besides the blank time intervals T_B2, T_B3, T_B4 which respectively exists after the exposure time intervals T_E1, T_E2, T_E3, a blank time interval T_B1 also exists before the exposure time intervals T_E1 in which an exposure operation is firstly performed in the first flicker period T_LP1.

In the embodiment of FIG. 4, the operations of the summing circuit 205 in FIG. 2 can change corresponding to the lengths of exposure time intervals. For example, in the embodiment of FIG. 4, the summing circuit 205 adds the sub-frames corresponding to the exposure time intervals T_E1, T_E2 and T_E3 to generate the summing sub-frame F_SS. In such case, a summing of the lengths of the exposure time intervals T_E1, T_E2 and T_E3 equals to an exposure time interval which is needed for sensing a frame under the same exposure condition in a conventional image sensing step. Further, the optical sensor 200 outputs the summing sub-frame as the sensing frame F_SS.

In the embodiments illustrated in FIG. 3 and FIG. 4, lengths of the exposure time intervals are identical, and lengths of the blank time intervals are identical. Also, the exposure time intervals are distributed in a single flicker time period (the first flicker time period T_LP1). However, the lengths of the exposure time intervals can be different, the blank time intervals can be different, and the exposure time intervals can be distributed in more than one flicker time period. As shown in the embodiment of FIG. 5, the exposure time intervals T_E1, T_E2 are within the first flicker time period T_LP1 and the exposure time interval T_E3 is within the second flicker time period T_LP2. Additionally, a length of the blank time interval T_B3 is larger than lengths of the blank time intervals T_B1, T_B2. Moreover, a length of the exposure time interval T_E3 is larger than lengths of the exposure time intervals T_E1, T_E2.

Figure 6:
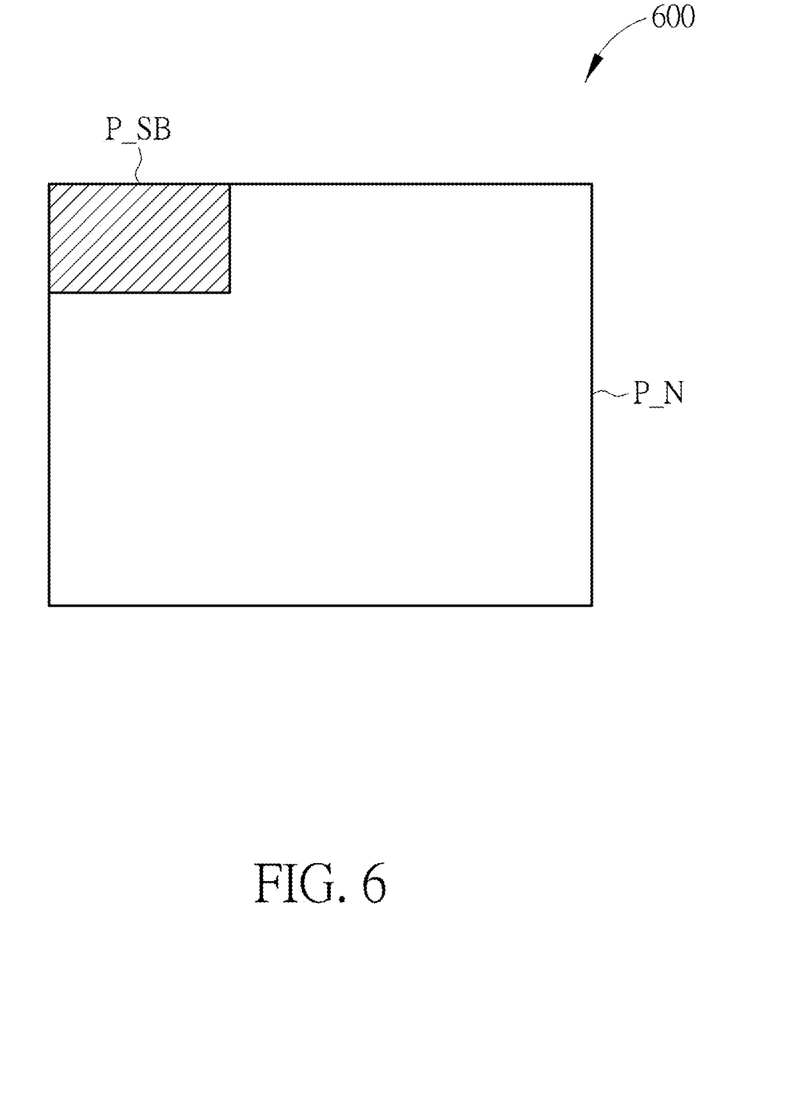
FIG. 6 is a schematic diagram illustrating only a portion of pixels of a frame are exposed.

In above-mentioned embodiments, the exposure operations are performed in a frame period. Also, in above-mentioned embodiments, the plurality of exposure operations are performed for all pixels of a frame. That is, the "distributed exposure" is performed to all pixels of the pixel array 201. However, the exposure operations can be performed to only a portion of pixels of the frame. FIG. 6 is a schematic diagram illustrating only a portion of pixels of a frame are exposed. That is, the "distributed exposure" is performed to only a portion of pixels of the of the pixel array 201. As illustrated in FIG. 6, the frame 600 means a frame corresponding to all pixels of the pixel array 201 in FIG. 2. The sub-pixels P_SB means pixels correspond to the above-mentioned sub-frame. That is, the sub-pixels P_SB perform at least two exposure operations in a single frame period, such as the embodiments illustrated in FIG. 3, FIG. 4 and FIG. 5. The normal pixels P_N mean the pixels which perform only one time exposure operation in a single frame period. That is, the normal pixels P_N are generated via a conventional image sensing step. In the above-mentioned embodiments, numbers of the pixels of the sub-frames and a number of pixels of the sensing frame are identical. That is, numbers of the pixels of the sub-pixels P_SB and a number of pixels of the frame 600 are identical. However, in another embodiment, numbers of the pixels of the sub-frames can be smaller than a number of pixels of the sensing frame. In other words, a number of the sub-pixels P_SB can be smaller than a number of pixels of the frame 600.

Please refer to FIG. 2 again, for the case that a number of the sub-pixels P_SB is smaller than a number of pixels of the frame 600, the read out circuit 203 reads the sub-frames corresponding to the sub-pixels P_SB and reads a normal frame portion corresponding to the normal pixels P_N. After that, the summing circuit 205 adds the sub-frames to generate a summing sub-frame, and then transmits the summing sub-frame to the amplifier 207. In such case, the read out circuit 203 or the summing circuit 205 transmits the normal frame portion to the amplifier 207. Since the summing sub-frame and the normal frame portion form the sensing frame F_SS, these operations can be regarded as "the optical sensor 200 outputs the sensing frame".

In one embodiment, the generation of sub-frames can be activated and non-activated. For more detail, the optical sensor 200 senses the sub-frames to generate the sensing frame in a first mode. Further, the optical sensor senses the sensing frame by a first exposure time interval in a second mode, that is, the optical sensor 200 perform only one exposure operation to sense the sensing frame (i.e., a conventional exposure step) in the second mode. The optical sensor selectively operates in the first mode or the second mode according to a length of the sensing interval. For more detail, the optical sensor operates 200 in the first mode if the sensing interval is less than or identical to the flicker period and operates in the second mode if the sensing interval is larger than the flicker period.

In view of above-mentioned embodiments, the optical sensor provided by the present invention can be summarized as: an optical sensor, for sensing a sensing frame (e.g., the sensing frame F_SS in FIG. 2) corresponding to a flicker period of ambient light, comprising: a pixel array (e.g., the pixel array 201 in FIG. 2), configured to perform N times of exposure operations via at least one pixel of the pixel array in N exposure time intervals to generate N sub-frames, wherein a summation of the N exposure time intervals (i.e., the sensing interval) is less or identical to a first flicker period (e.g., the first flicker period T_LP1 in FIG. 3). The optical sensor is further configured to add the N sub-frames to generate a summing sub-frame, wherein the sensing frame comprises the summing sub-frame.

In above-mentioned embodiments, the sub-frames which are analog signals are added. However, the adding operation can be performed to digital signals rather than limited to analog signals.

Figure 7:
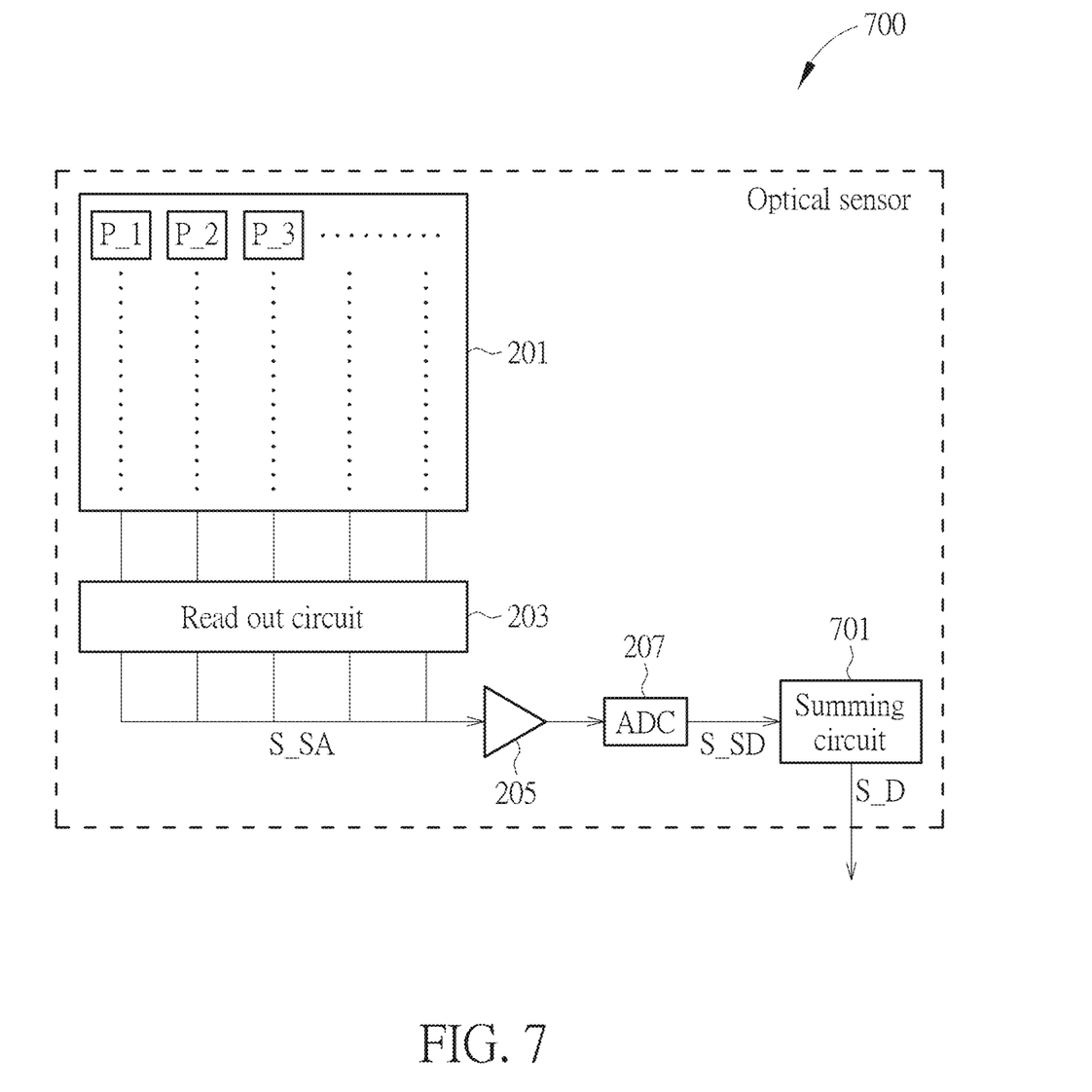
FIG. 7 is a block diagram illustrating an optical sensor according to another embodiment of the present invention.

FIG. 7 is a block diagram illustrating an optical sensor according to another embodiment of the present invention. As illustrated in FIG. 7, besides the pixel array 201 and the read out circuit 203 illustrated in FIG. 2, the optical sensor 700 further comprises the amplifier 205 and the ADC 207. Please note the amplifier 205 can be removed from the optical sensor 700. Besides, a summing circuit 701 is provided for processing the digital signal output by the ADC 205 rather than processing the analog signal output by the read out circuit 203.

Therefore, the optical sensor 700 in FIG. 7 can be summarized as: an optical sensor, for sensing a sensing frame corresponding to a flicker period of ambient light, comprising: configured to perform N times of exposure operations via at least one pixel of the pixel array in N exposure time intervals to generate N sub-frames, wherein a summation of the N exposure time intervals equals to a sensing interval and the sensing interval is less than or identical to a first flicker period; a read out circuit (e.g., the read out circuit 203), configured to read the N sub-frames to generate sub analog sensing signals (e.g., the analog sensing signals S_SA); an ADC (e.g., the ADC 207), configured to transform the analog sensing signals to sub digital sensing signals (e.g., the sub digital sensing signals S_SD); and a summing circuit (e.g., the summing circuit 701), configured to add the sub digital sensing signals to generate a sub digital sensing signal, to generate a digital sensing signal (e.g., the digital sensing signal S_D) corresponding to the sensing frame.

The embodiments illustrated in FIG. 3, FIG. 4, FIG. 5 and FIG. 6 can also be applied to the embodiment illustrated in FIG. 7. Details thereof are already disclosed in above-mentioned descriptions, thus are omitted for brevity here.

In view of above-mentioned embodiments, the influences caused by the fluctuation of ambient light can be neutralized, since the frame or portion of the frame is sensed at least twice at different phases of a single flicked period. By this way, the conventional flicker issue can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensor, for sensing a sensing frame corresponding to a flicker period of ambient light, comprising:
   a pixel array, configured to perform N times of exposure operations via at least one pixel of the pixel array in N exposure time intervals to generate N sub-frames;
   wherein the optical sensor is further configured to add the N sub-frames to generate a summing sub-frame, wherein the sensing frame comprises the summing sub-frame;
   wherein the optical sensor outputs the sensing image after sensing the N sub-frames and before sensing a new sub-frame not belonged to the N sub-frames.

2. An optical sensor, for sensing a sensing frame corresponding to a flicker period of ambient light, comprising:
   a pixel array, configured to perform N times of exposure operations via at least one pixel of the pixel array in N exposure time intervals to generate N sub-frames;
   a read out circuit, configured to read the N sub-frames to generate sub analog sensing signals;
   an ADC, configured to transform the analog sensing signals to sub digital sensing signals; and
   a summing circuit, configured to add the sub digital sensing signals to generate a digital sensing signal corresponding to the sensing frame;
   wherein the optical sensor outputs the sensing image after sensing the N sub-frames and before sensing a new sub-frame not belonged to the N sub-frames.

3. The optical sensor of claim 2, wherein the N exposure time intervals are identical.

4. The optical sensor of claim 2, wherein the N exposure time intervals have as least two different exposure time intervals.

5. The optical sensor of claim 2, wherein a blank time interval exists between two neighboring exposure time intervals within the N exposure time intervals, wherein the optical sensor does not sense any frame in the blank time interval.

6. The optical sensor of claim 2, wherein a summation of the N exposure time intervals equals to a sensing interval, wherein the optical sensor senses the N sub-frames to generate the sensing frame in a first mode, wherein the optical sensor senses the sensing frame by a first exposure time interval in a second mode, and wherein the optical sensor selectively operates in the first mode or the second mode according to a length of the sensing interval.

7. An optical sensor, for sensing a sensing frame corresponding to a flicker period of ambient light, comprising:
   a pixel array, configured to perform N times of exposure operations via at least one pixel of the pixel array in N exposure time intervals to generate N sub-frames;
   a read out circuit, configured to read the N sub-frames to generate sub analog sensing signals;
   an ADC, configured to transform the analog sensing signals to sub digital sensing signals; and
   a summing circuit, configured to add the sub digital sensing signals to generate a digital sensing signal corresponding to the sensing frame;
   wherein the optical sensor outputs the sensing image within a time interval of a flicker period after sensing a first one of the N sub-frames.

8. The optical sensor of claim 7, wherein the N exposure time intervals are identical.

9. The optical sensor of claim 7, wherein the N exposure time intervals have as least two different exposure time intervals.

10. The optical sensor of claim 7, wherein a blank time interval exists between two neighboring exposure time intervals within the N exposure time intervals, wherein the optical sensor does not sense any frame in the blank time interval.

11. The optical sensor of claim 7, wherein a summation of the N exposure time intervals equals to a sensing interval, wherein the optical sensor senses the N sub-frames to generate the sensing frame in a first mode, wherein the optical sensor senses the sensing frame by a first exposure time interval in a second mode, and wherein the optical sensor selectively operates in the first mode or the second mode according to a length of the sensing interval.

12. An optical sensor, for sensing a sensing frame corresponding to a flicker period of ambient light, comprising:
   a pixel array, configured to perform N times of exposure operations via at least one pixel of the pixel array in N exposure time intervals to generate N sub-frames;
   wherein the optical sensor is further configured to add the N sub-frames to generate a summing sub-frame, wherein the sensing frame comprises the summing sub-frame;
   wherein the optical sensor outputs the sensing image within a time interval of a flicker period after sensing a first one of the N sub-frames.

* * * * *